United States Patent [19]

Shibata

[11] Patent Number: 4,885,598

[45] Date of Patent: Dec. 5, 1989

[54] CAMERA HAVING DATA RECORDING FUNCTION

[75] Inventor: Isao Shibata, Yamanashi, Japan

[73] Assignee: Nippon Seimitsu Kogyo Kabushiki Kaisha, Kofu, Japan

[21] Appl. No.: 140,212

[22] Filed: Dec. 31, 1987

[51] Int. Cl.$^4$ ............................................. G03B 17/24
[52] U.S. Cl. .................................................. 354/106
[58] Field of Search ............... 354/105, 106, 436, 437, 354/486, 107–109, 400

[56] References Cited

U.S. PATENT DOCUMENTS 4,327,979  5/1982  Tominaga et al. ................... 354/105

FOREIGN PATENT DOCUMENTS

| 55-93135 | 7/1980 | Japan . |
| 55-98730 | 7/1980 | Japan . |
| 56-14227 | 2/1981 | Japan . |
| 56-77834 | 6/1981 | Japan . |
| 56-83729 | 7/1981 | Japan . |
| 56-109328 | 8/1981 | Japan . |
| 56-132321 | 10/1981 | Japan . |
| 61-110123 | 5/1986 | Japan . |
| 62-14630 | 1/1987 | Japan . |

Primary Examiner—L. T. Hix
Assistant Examiner—David M. Gray
Attorney, Agent, or Firm—Oblon, Spivak, McClelland, Maier & Neustadt

[57] ABSTRACT

In an auto-focus, auto-exposure camera, a shutter operating member for controlling a consecutive photographing operation including focusing and exposing is provided with a program switch means for determining the timing of data recording so as to enable the data recording to be effected in the course of the photographing operation. By controlling the photographing operation by use of the program switch means, the data recording can effectively be performed without increasing the time required for the photographing operation.

4 Claims, 10 Drawing Sheets

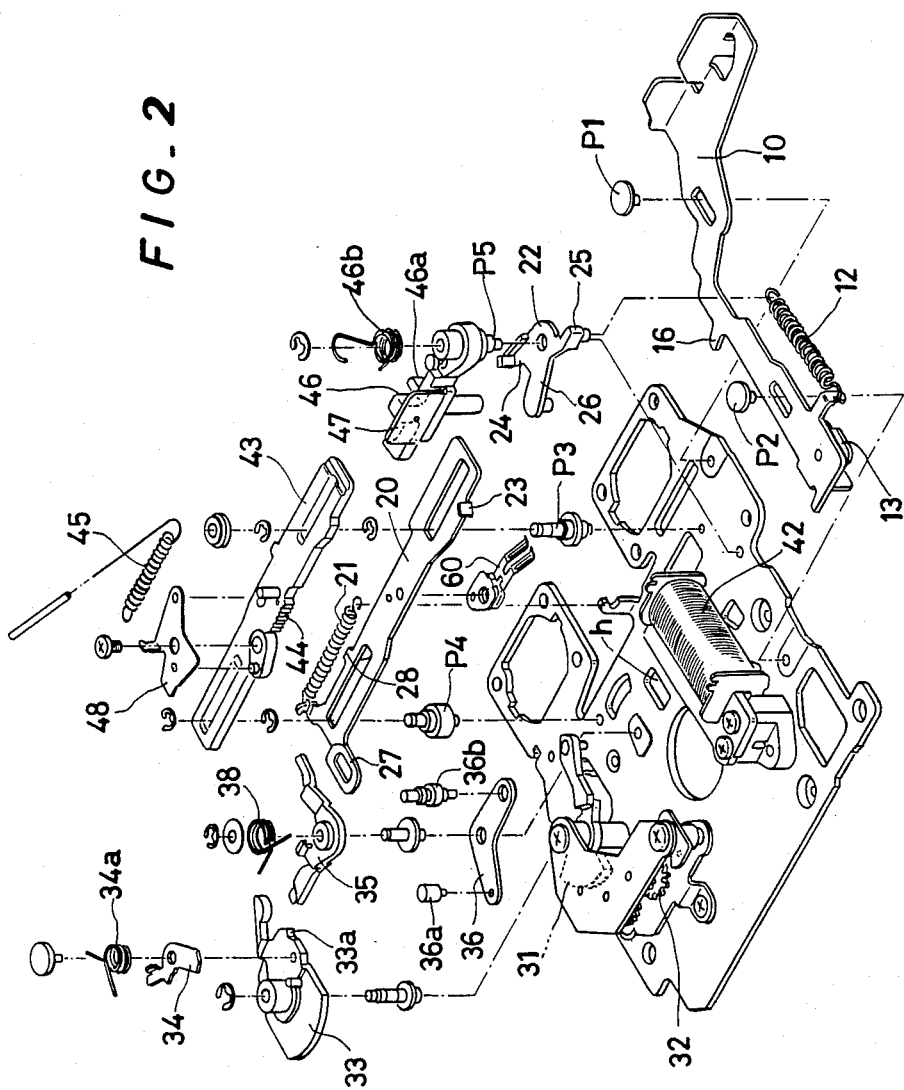

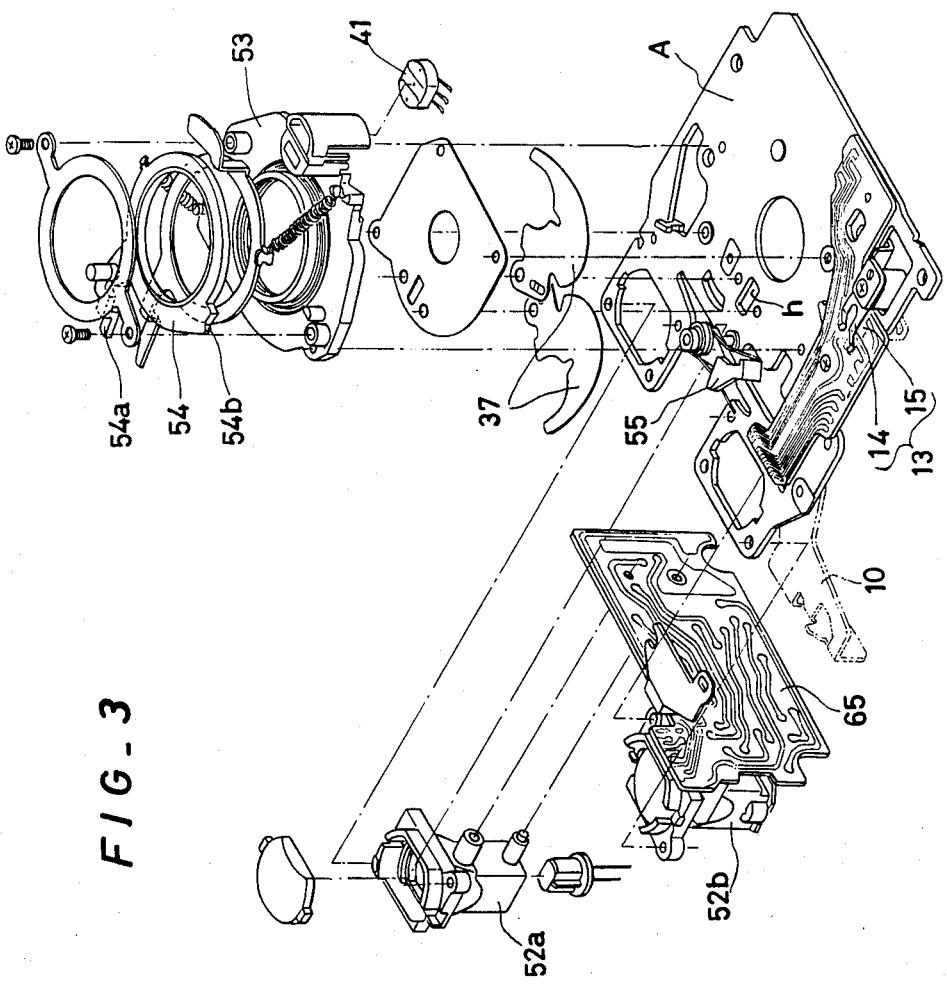

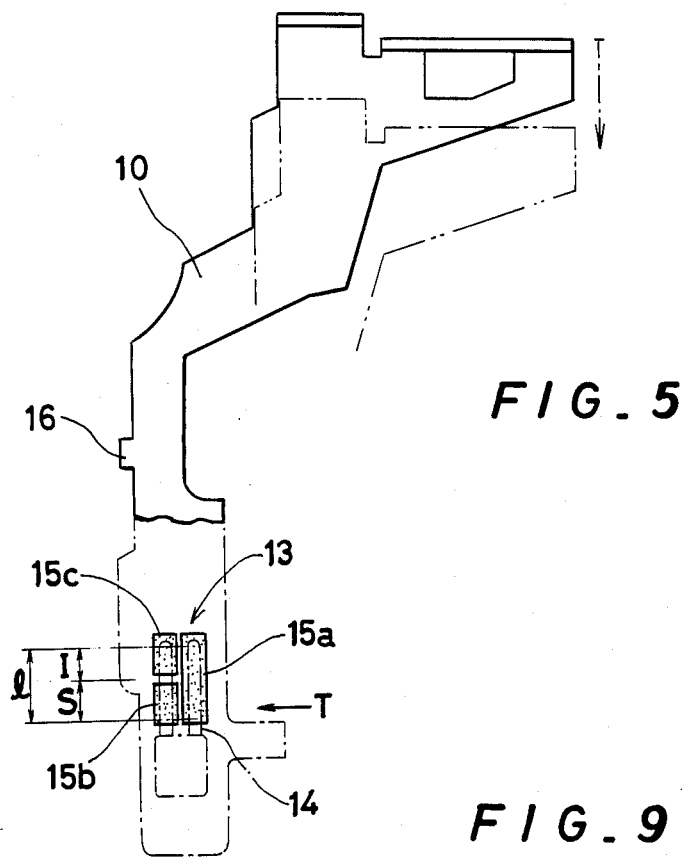
FIG_5
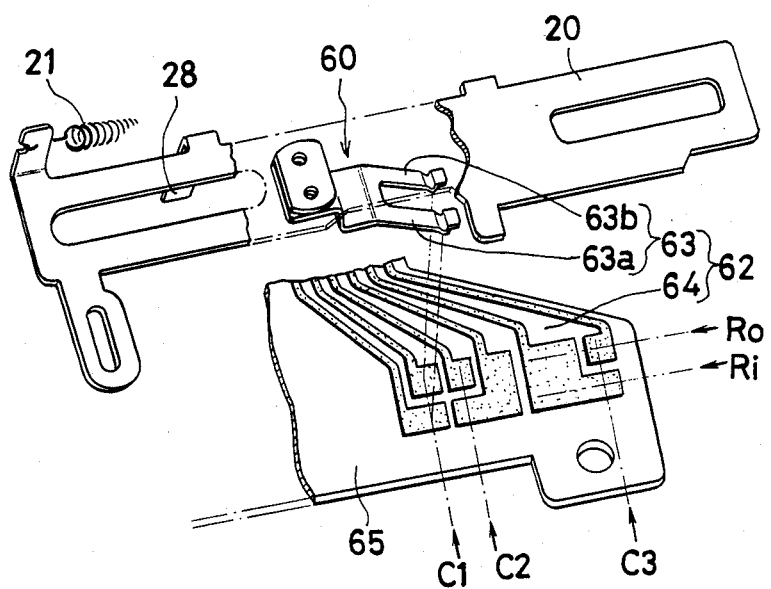
FIG_9

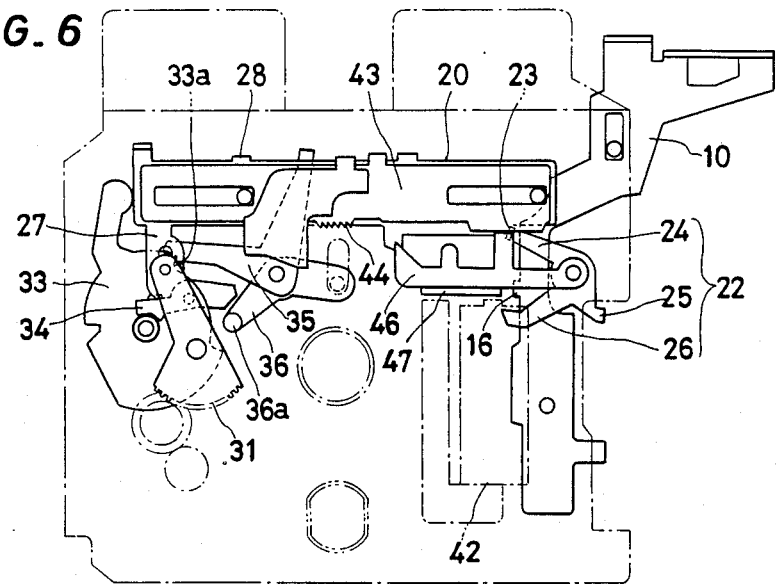
FIG._6
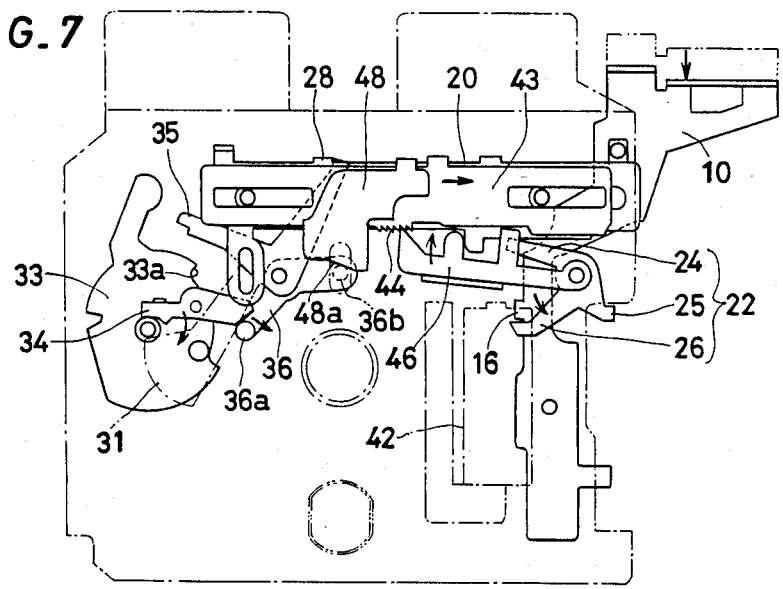
FIG._7

FIG_10
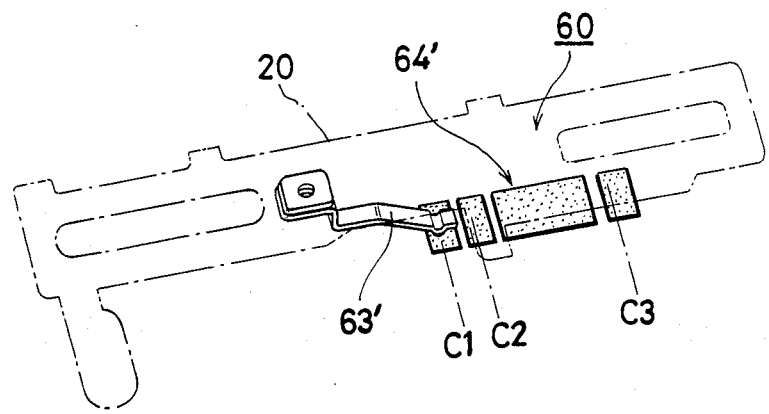
FIG_11
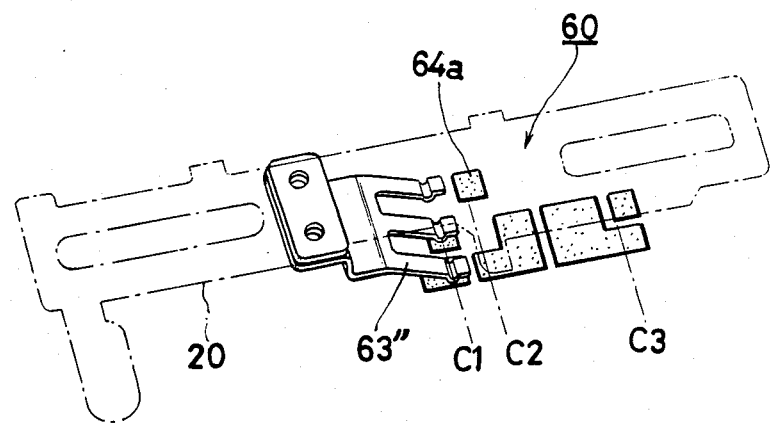

CAMERA HAVING DATA RECORDING FUNCTION

BACKGROUND OF THE INVENTION

1. Field of the Invention

This invention relates to a camera having a function of recording data such as a date, time or the like on a film loaded in the camera together with an image of a subject to be photographed, and more particularly, to an auto-focusing and auto-winding camera capable of effectively performing data recording in a consecutive photographing operation including exposing, focusing and shutter releasing.

2. Description of the Prior Art

There have heretofore been developed a number of auto-focusing cameras having a function of recording data such as a date, time or various photographing data on a film loaded in a camera body while taking a photograph.

Some types of principal mechanisms in the camera such as iris-shutter operating means and automatic focusing means have been proposed to date. For example, one of these has been earlier proposed by the inventor of this invention. (Japanese Patent Application Public Disclosure SHO No. 61-110123)

On the other hand, one version of a data recording device for recording data such as a date and time on a film is disclosed in U.S. Pat. No. 4,327,979.

Briefly stated, the data recording may be carried out within the period of time from shutter releasing to completion of photographing so that the data such as a date and time can be recorded. Nevertheless, the data recording which may sound like easy cannot easily be carried out in actual. In a date recording system in an ordinary automatic camera, which has light emitting means such as photodiode segments, the average time required for data recording is generally about 60 milliseconds. This data recording time is longer than that required for shutter releasing when the shutter opening-closing operation is effected at 1/60 sec., i.e. approximately 17 milliseconds. Compared with the time required for auto-focusing or auto-exposing, it is considerably longer. From the viewpoint of the efficiency of the existing light emitting means and the need for miniaturization and portability of a camera, for the present, the aforesaid time required for data recording (60 milliseconds) cannot be reduced.

How the data recording operation should be executed in the consecutive photographing operation including the automatic distance-measurement for focusing, automatic brightness-measurement, automatic focal-point determination, shutter releasing, etc. is a problem to be solved from the standpoint of the aforementioned needs of the automatic camera with a data recording function.

There have been two methods of effecting the data recording, i.e. the pre-recording method and the post-recording method. In the pre-recording method, the data recording operation is carried out prior to the consecutive photographing operation including the focusing and exposing. The data recording which is effected after the consecutive photographing operation is designated as the post-recording method.

As one example of the pre-recording method, there has been proposed a data recording device for cameras in the aforementioned U.S. Pat. No. 4,327,979. This prior art device affects the data recording operation at an early stage of automatic focusing movement preceding the consecutive photographing operation including shutter releasing. Therefore, the data recording operation which is carried out before the consecutive photographing operation causes shutter releasing to be delayed. As a consequence, this method has suffered from inefficiency in that the time required for one photographing shot is lengthened.

In addition, if the prior art data recording device is constructed so that the data recording operation can be effected at the time of pressing a shutter release button in order for the shortage of photographing time, the data is printed on the film immediately after pressing the shutter release button. This entails a disadvantage in that once the shutter release button is pressed, the photographing operation cannot be called for even before the shutter is released or even when an exposure measuring circuit which is generally operated at the time of depressing the shutter release button detects an underexposure state.

Also, in a camera of the type in which data recording is performed upon completion of film winding as proposed by Japanese Patent Application Public Disclosure SHO No. 62-14630, the photographing operation cannot be canceled en route.

In the post-recording method described above in which the data recording operation is effected with the closing movement of the shutter after the opening of the shutter for forming an aperture is completed, the film winding cannot be performed immediately after the completion of shutter opening-closing. Accordingly, if the film winding is carried out in the data recording operation, a data image is printed on the film in a streaming manner.

Either of the methods requires a prolonged time for data recording and is unfit for automatic cameras.

There are also known data recording devices (cf. Japanese Patent Application Public Disclosures SHO No. 55-93135; SHO No. 55-98730; SHO No. 56-14227; SHO No. 56-77834; SHO No. 56-83729; SHO No. 56-109328; and SHO No. 56-132321). However, nothing in these prior art references discloses a data recording device capable of efficiently effecting data recording in the course of a consecutive photographing operation consisting of focusing, aperture determining and shutter releasing.

SUMMARY OF THE INVENTION

An object this invention is to provide an automatic camera capable of effectively and reliably recording data such a date, time or the like on a film without impeding a consecutive photographing operation consisting of focusing, aperture-determining and shutter releasing, thereby enabling prompt execution of the movements from shutter releasing to film winding.

Another object of this invention is to provide an automatic camera capable of effecting distance measurement for auto-focusing and brightness measurement prior to the shutter releasing so as to enable photographing operation for effecting the distance and brightness measurements which starts by depressing a shutter release lever to be arbitrarily called for en route without effecting the data recording.

To accomplish the objects described above according to this invention, there is provided a camera comprising focus control means for focusing a lens system on a subject to be photographed, exposure control means for determining an aperture formed in a shutter in accordance with the brightness of the subject, a shutter operating member which is movable from its rest position to its charge position in shutter releasing and vice versa, program switch means for outputting a data recording signal while the shutter operating means in the charge state moves toward the rest position in shutter releasing, and data printing means for printing required data on a film loaded in the camera in response to the data recording signal output from the program switch means in shutter releasing.

The program switch means is composed of a contact pattern for determining the timing for operating the data recording circuit and a slide collector which is in slidable contact with the contact pattern and moves in conjunction with the shutter operating member. While the shutter operating member moves from its charge position toward its rest position, the focus control means, the exposure control means and the data recording means are efficiently operated under the control of the program switch means. Thus, data such as date, time or the like can be printed on a film loaded in the camera at the time of exposing, and therefore, a film winding operation for the next photographing shot can be carried out as soon as the consecutive photographing operation is completed.

The shutter operating member in the charge state is triggered to move toward the rest position by a release lever movable vertically. The release lever has a moving stroke having an idling section in the first half thereof. Though the brightness measurement for exposure and the distance measurement for focusing are performed by operating the release lever, the photographing can be called off without effecting the data recording operation, if the release lever is in the idling section.

The further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS:

The present invention will become more fully understood from the detailed description given hereinbelow and the accompanying drawings which are given by way of illustration only, and thus ar not limitative of the present invention, and wherein:

FIG. 2 is an exploded perspective view illustrating the essential elements on the rear side of an internal base plate in the camera according to this invention;

FIG. 3 is an exploded perspective view illustrating the same on the front side of the internal base plate;

Figure 4A:
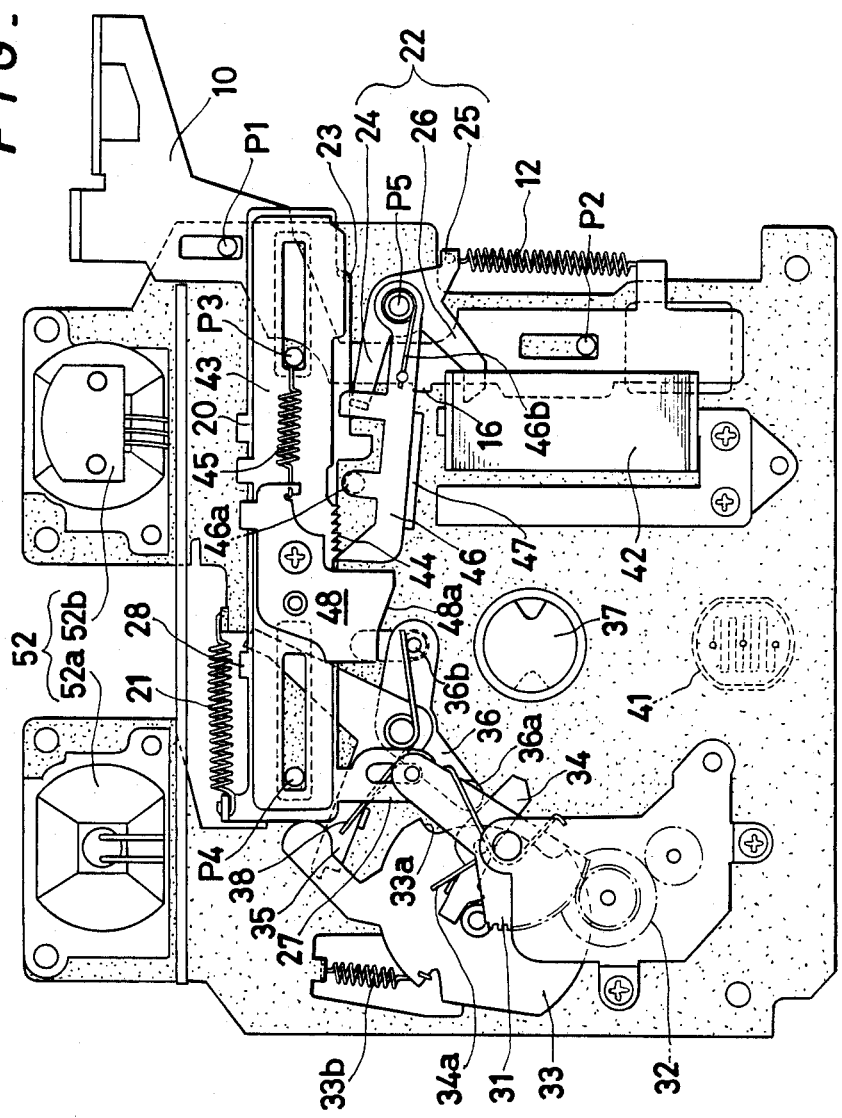
Figure 4B:
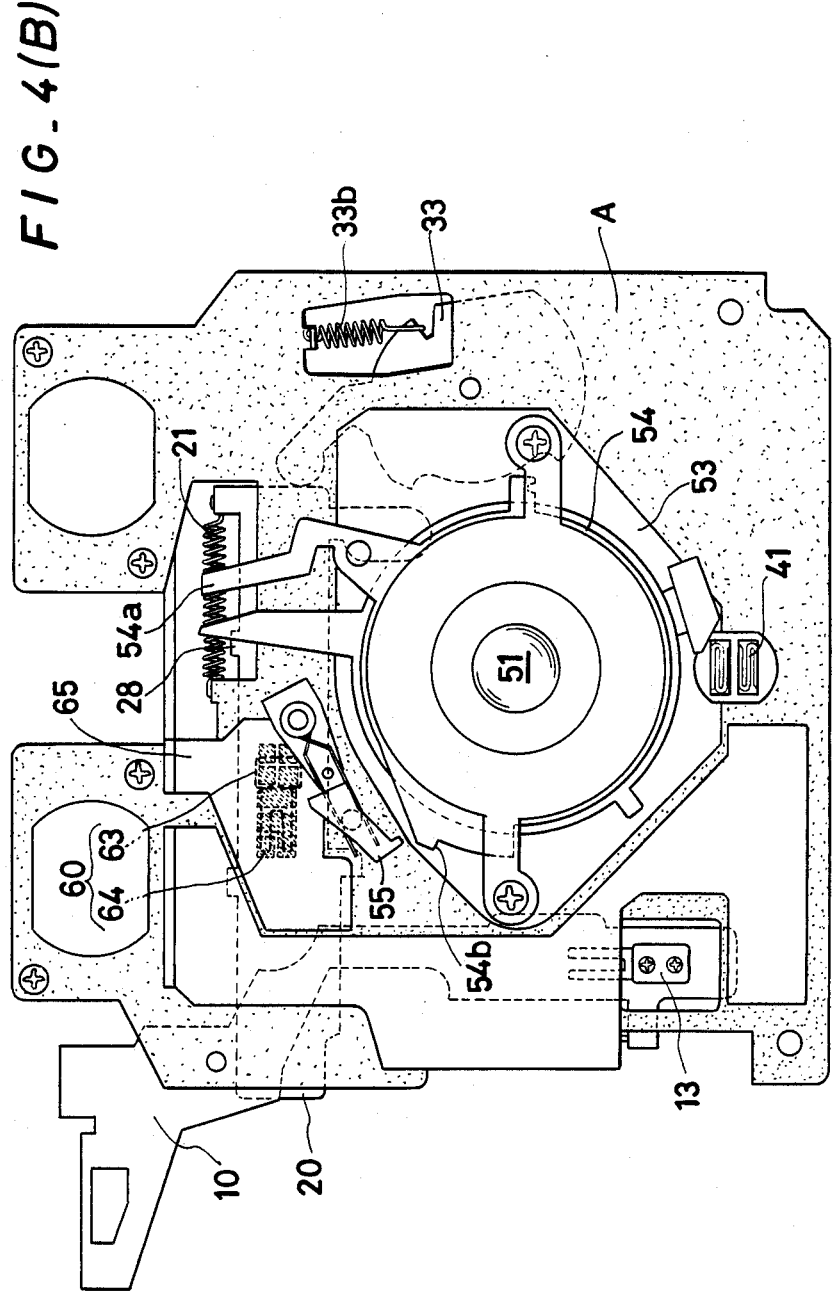
Figure 8:
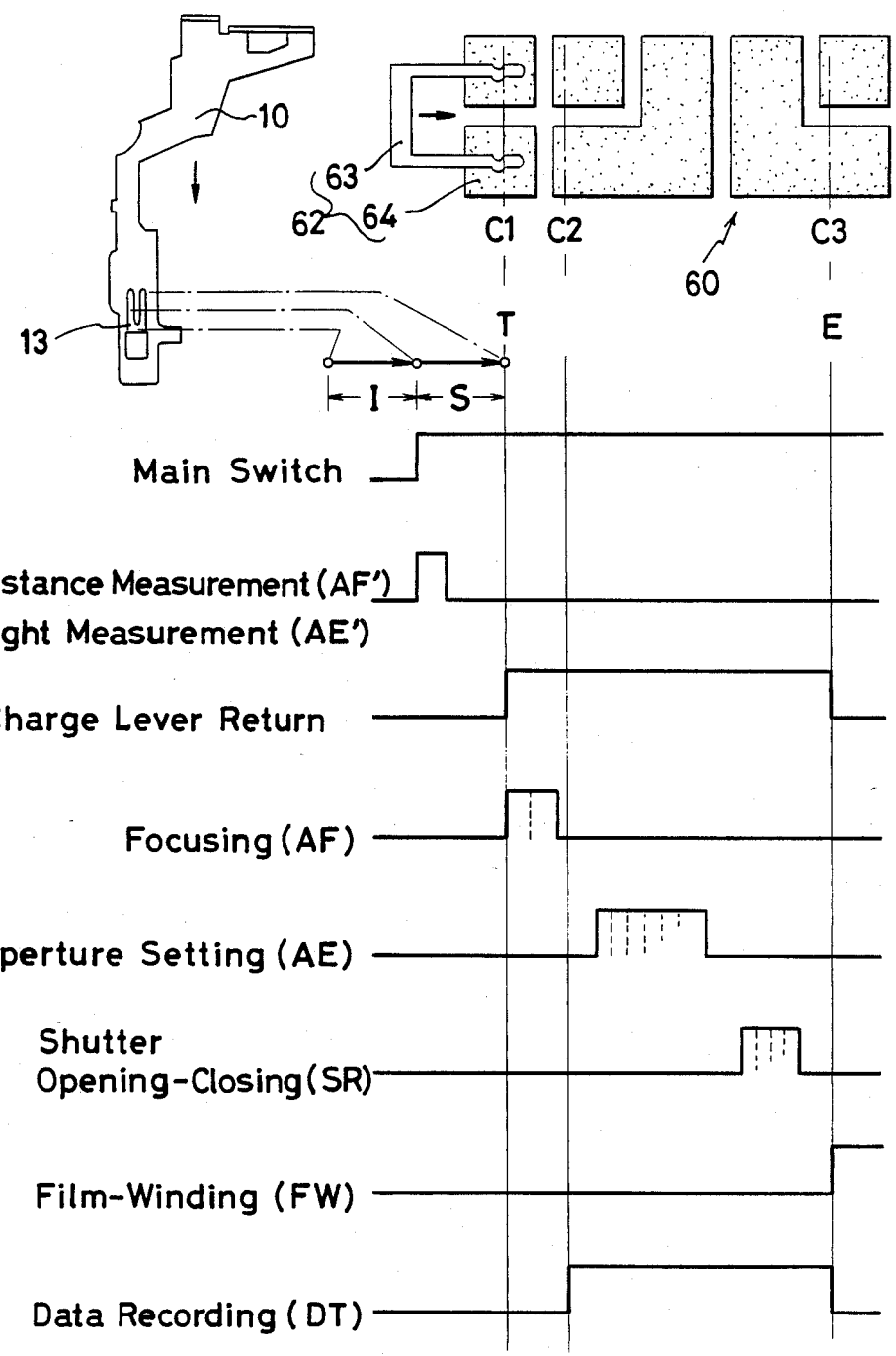
Figure 12:
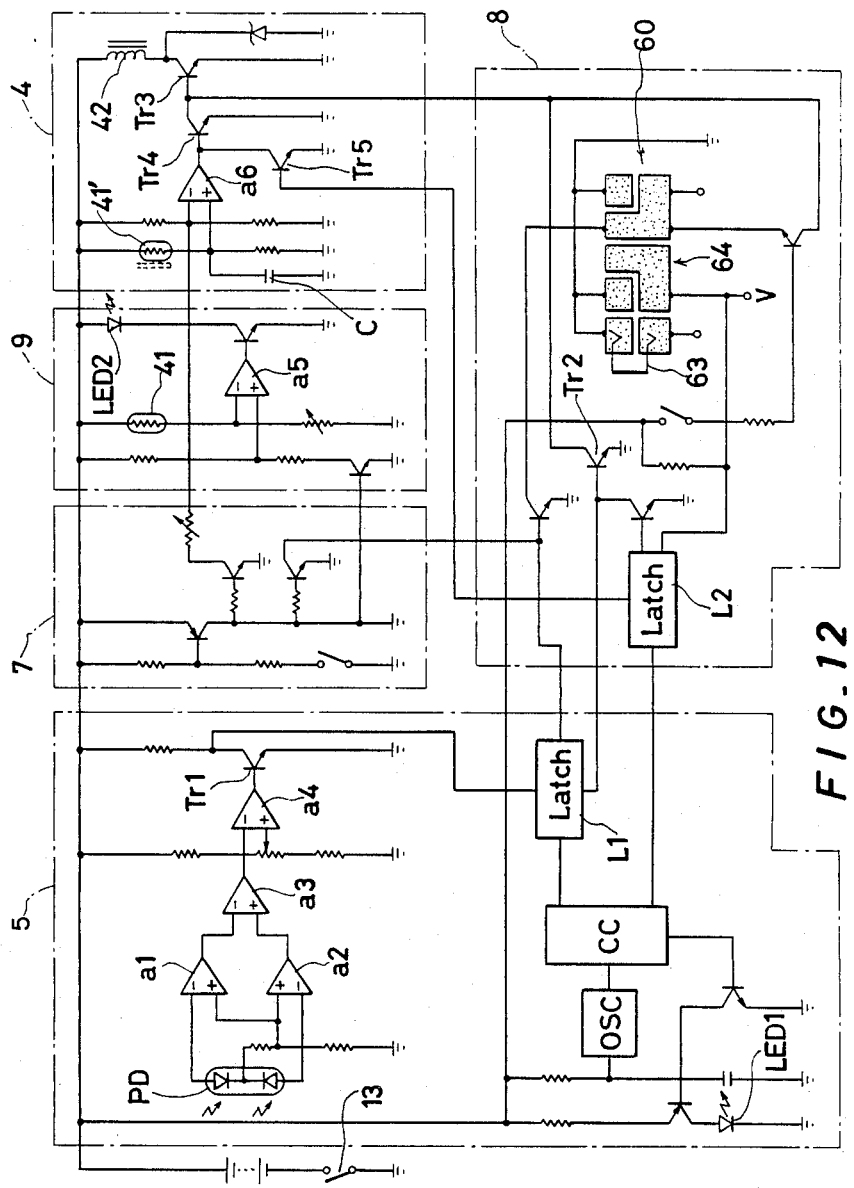

FIG. (A) is a rear elevation illustrating the essential elements on the internal base plate in their rest state thereof in the camera of this invention;

FIG. 4(B) is a front elevation of the same;

FIG. 5 is an explanatory diagram illustrating in front elevation the movement of a shutter release lever in the camera of this invention;

FIG. 6 is an explanatory diagram illustrating the moving elements in the charge state in the camera of this invention;

FIG. 7 is an explanatory diagram illustrating the moving elements in the returning state in the camera of this invention;

FIG. 8 is a timing chart for explaining the control of operation of essential parts in the camera of this invention;

FIG. 9 is a partially cutaway view in perspective of a program switch in one embodiment of this invention;

FIG. 10 is a partially cutaway view in perspective of a program switch in means another embodiment of this invention;

FIG. 11 is a partially cutaway view in perspective of a program switch means in still another embodiment of this invention; and FIG. 12 is a schematic diagram of an electronic control unit which may be employed as one example by the camera of this invention.

DESCRIPTION OF THE PREFERRED EMBODIMENTS:

This invention relates to a camera capable of recording on a film data such as a date, time, various photographing data, etc. in the course of a consecutive photographing operation including automatic exposing and focusing operations and shutter opening and closing movements. One preferred embodiment of the camera according to this invention will now be described with reference to the accompanying drawings.

[Essential Structure Of Automatic Camera]

Figure 1:
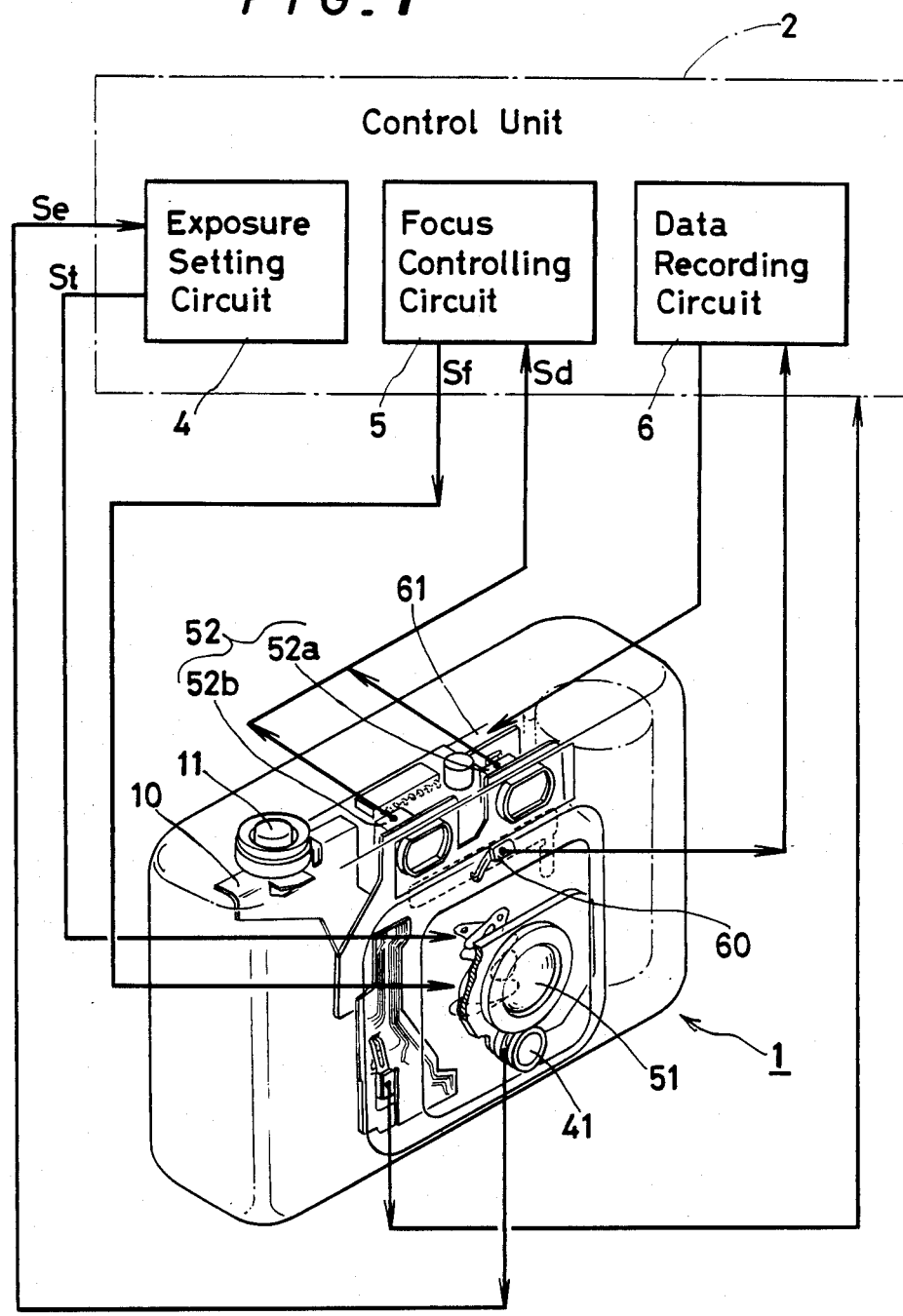
FIG. 1 is a schematic perspective view of one typical automatic compact camera according to this invention.

The camera 1 according to this invention is similar in structure to an ordinary automatic compact camera of a lens shutter type as illustrated by the perspective view in FIG. 1 and has automatic exposing, focusing, film-winding and data recording functions. In FIG. 1 is schematically illustrated an electronic control unit 2 for fulfilling the aforementioned functions.

In the drawing, reference numeral 4 denotes an exposure controlling circuit in which appropriate exposing values varying with the brightness of a subject to be photographed are programmed. Upon reception of a light-volume signal Se obtained by measuring the brightness of the subject by means of a photodetector 41, the exposure controlling circuit 4 serves to output an exposing signal St representing the appropriate exposing value proportional to the brightness of the subject to an exposure setting mechanism (described later). Thus, the exposure can be automatically controlled in accordance with the brightness of the subject. Accordingly, an exposure control means is constituted principally by the aforementioned exposure controlling circuit 4, photo detector 41 and exposure setting mechanism.

Reference numeral 5 denotes a focus controlling circuit in which the focal distance values of a camera lens 51 relative to the film loaded in the camera, which values are appropriately determined in accordance with the distance from the lens 51 to the subject to be photographed, are programmed.

The distance from the lens to the subject is measured by means of a distance measuring means 52 disposed in the front side of the camera body. The focus controlling circuit 5 is adapted to output a focus setting signal Sf to a lens driving mechanism (described later) for focusing, upon reception of a distance signal Sd fed from the distance measuring means 52. In this embodiment, the distance measuring means 52 adopts an infrared-ray irradiating method in which a difference in time between the time at which infrared rays are directed to the subject and the time at which the infrared rays reflected from the subject are received is calculated to measure the distance from the lens to the subject. Thus, the distance measuring means 52 in this embodiment has a pair of distance measuring elements 52a, 52b. One of the elements 52a, 52b is an infrared ray emitting element and the other element is a photoelectric element which receives the light ray emitted from the infrared ray emitting element and reflected from the subject. Otherwise, a double-image coincidence system which utilizes parallax may be adopted as the distance measuring means. In the case of the double-image coincidence system, the elements 52a, 52b are image-pickup elements.

The aforementioned focus controlling circuit 5, distance measuring means 52 and lens driving mechanism are essential elements constituting a focus control means.

Reference numeral 6 denotes a data recording circuit. Generally, in case that a date and time are printed on the film loaded within the camera, the data recording circuit inevitably has a timer. The data recording circuit 6 is triggered to operate by a program switch means 60 at the specified time in the photographing operation, and simultaneously, it delivers a control signal to a data printing means 61 incorporated in a camera back or the camera body. The program switch means 60 which is the characteristic component of this invention is programmed to trigger the data recording circuit 6 at the specified time in the consecutive photographing operation consisting of exposing and focusing. The structure and operations of the program switch means 60 will be explained in detail later.

The data printing means 61 has a known structure composed of a plurality of light-emitting diode segments capable of illuminating required information patterns of a letter, figure or the like. The aforementioned data recording circuit 6, program switch means 60, and data printing means 61 mainly constitutes a data-recording control means.

The structures of the exposure control means, focus control means, and data recording control means should not be understood as limitative.

Before going into a detailed explanation of the operation of the data recording mechanism which is the heart of this invention, the fundamental operation of the automatic camera to which this invention is applied will be explained hereinafter with reference to FIGS. 2 to 7. Since a film winding function has no direct connection with this invention, a film winding mechanism is not shown in the drawings and an explanation thereof is omitted.

[Shutter Opening-Closing Operation]

The primary moving mechanism in the camera is generally composed of a release lever 10 connected to a shutter release (shutter release button) 11 and adapted to trigger movements of the moving components including a shutter 37, a shutter operating member 20 for controlling the opening and closing movements of the shutter 37, and an aperture determining mechanism.

The release lever 10 which is moved downward by depressing the shutter release 11 is supported slidably in the vertical direction on a base plate A retained within the camera body by means of guide pins P1, P2 and biased upward by a spring 12.

The release lever 10 is provided on its one surface (on the front side of the base plate A) with a main switch means 13. This main switch means 13 is constituted by a slide collector 14 fixed on the release lever 10 and a conductor pattern 15 formed on a circuit board fixed on the base plate A. The conductor pattern 15 is composed of a ground contact 15a having a length substantially equal to the moving stroke l of the release lever 10 and an input contact 15b defined in the latter half of the stroke l of the release lever 10, as illustrated in FIG. 5. A segment 15c formed in the first half of the stroke l is a dummy contact. Thus, even if the release lever 10 is pressed, the main switch means 13 is not turned into its ON state unless the slide collector 14 reaches the input contact 15b. Namely, the extent in which the main switch means 13 is kept its OFF state is designated as an idling section I. When the release lever 10 is further depressed against the spring 12, the slide collector 14 comes into electrical contact with the input contact 15b, thereby to allow the entire electric system of the camera to be turned ON. In the vicinity of the lower limit point so far which the release lever 10 is allowed to move downward, a trigger point T is defined within a standby section S.

The shutter operating member 20 is supported slidably in the lateral direction on the base plate A by means of guide pins P3, P4 and biased in one direction by a spring 21. Thus, the shutter operating member 20 is positioned at an initial position (rest position) in the initial state thereof as illustrated in FIG. 4(A). At the same time that a film winding motor or lever (not shown) is operated to wind the film loaded in camera, the shutter operating member 20 is moved against the spring 21 in the left direction in FIG. 4(A) to its charge position, consequently to assume a charge state as illustrated in FIG. 6. On the base plate A, there is pivotally supported a latch member 22 for retaining the shutter operating member 20 by a pin P5 at the charge portion in a photographing standby state. The latch member 22 comprises a latch arm 24 which comes into engagement with a shoulder portion 23 of the shutter operating member 20 so as to prevent the return motion of the shutter operating member 20 kept in the charge state, a hook arm 25 to which the spring 12 is hooked on, and an operating arm 26 which is urged downwardly against the spring 12 by a trigger member 16 formed on the release lever 10 when the release lever 10 moves downward to the trigger point T. Thus, the shutter operating member 20 which moves to the charge position at the time of the film winding is retained there and prevented from returning to the rest position by means of the latch arm 24 which is engaged with the shoulder portion 23 of the shutter operating member 20 as illustrated in FIG. 6. Then, by depressing the release lever 10 to the trigger point T, the trigger member 16 of the release lever 10 operates to urge downwardly the hook arm 25 against the spring 12. As a result, the latch arm 24 is released from the shoulder portion 23 of the shutter operating member so as to allow the return motion of the shutter operating member 20 to the rest position.

Further, the shutter operating member 20 is provided with a cam member 27 which is in engagement with a sector gear member 31 incorporated in a speed regulating mechanism 32 for maintaining the motion of the shutter operating member 20 at a fixed speed. The motion of the shutter operating member 20 is transmitted to the speed regulating mechanism 32 via the cam member 27 and the sector gear member 31, thereby to moderately damp the return motion of the shutter operating member 20.

A shutter opening-closing mechanism which is controlled by the shutter operating member 20 comprises a shutter driving member 33 which is in contact with one end face of the shutter operating member 20, a tap member 34 which is pivotally supported on the shutter driving member 33, a lock member 35 for retaining the shutter driving member 33 at the charge position, and a shutter opening-closing member 36 for opening and closing iris diaphragm leaves constituting the shutter 37.

The movement of each component in the shutter opening-closing mechanism will be apparent from a comparison between the rest state illustrated in FIG. 4(A) and the charge state illustrated in FIG. 6. While the shutter operating member 20 moves leftward in the drawings from the rest position (FIG. 4 (A)) to the charge position (FIG. 6), the shutter driving member 33 rotates counterclockwise and the tap member 34 which is pivotally supported on the shutter driving member 33 and biased counterclockwise by a spring 34a comes in touch with a pin 36a disposed on one end portion of the shutter opening-closing member 36. Since the shutter opening-closing member 36 is biased clockwise by a spring 38 and a guide pin 36b disposed on the other end portion of the shutter opening-closing member 36 is slidably guided in a slot hole h formed in the base plate A, the shutter opening-closing member 36 does not rotate even if the tap member 34 in contact with the pin 36a is further moved upwardly with the shutter driving member 33 rotating counterclockwise, with the result that the pin 36a, while receding clockwise, passes by the pin 36a to the upside of the pin 36a as illustrated in FIG. 6. Then, the lock member 35 biased counterclockwise by the spring 38 falls into a stepped portion 33a of the shutter driving member 33 so as to retain the shutter opening-closing mechanism in the charge state.

In this charge state, by depressing the release lever 10 to the trigger point T, the operating arm 26 of the latch member 22 is forcibly moved downwardly by the trigger member 16 of the release lever 10, thereby to cause the latch member 22 to be rotated counterclockwise against the spring 12.

As a consequence, the latch arm 24 of the latch member 22 is released from the shoulder portion 23 of the shutter operating member 20 so as to permit the return motion of the shutter operating member 20 in the rightward direction in FIG. 7 by the force of the spring 21. While the shutter operating member 20, returns toward the rest position, a claw member 28 formed on the shutter operating member 20 urges the upper end portion of the lock member 35 so as to rotate the lock member 35 clockwise, thereby to release the lock member 35 from the stepped portion 33a of the shutter driving member 33. Consequently, while the shutter driving member 33 rotates clockwise, the tap member 34 pivotally supported on the shutter driving member 33 taps the pin 36a on the one end portion of the shutter opening-closing member 36 so as to cause the shutter opening-closing member to be rotated counterclockwise and the guide pin 36b to be moved upward within the slot hole h, with the result that the iris diaphragm leaves of the shutter 37 are allowed to open to form the iris aperture. Then, the tap member 34 on the shutter driving member 33 passes by the pin 36a to the underside of the pin 36a. As a result, the shutter opening-closing member 36 is rotated in the clockwise direction for returning back to the initial position thereof by force of the spring 38, consequently to close the iris diaphragm leaves of the shutter 37. When the shutter opening-closing operation is completed all the moving components of the camera assume the rest state (initial state) as illustrated in FIG. 4(A), and at that instant, the function of winding the film is begun while the shutter operating member 20 moves toward the charge position as illustrated in FIG. 6.

[Automatic Exposing Operation]

An exposing operation is automatically controlled by the exposure control means so that the iris aperture formed by the iris diaphragm leaves of the shutter 37 in the aforesaid shutter opening-closing operation is appropriately determined in accordance with brightness of the subject to be photographed.

The brightness of the subject is detected by photodetector 41 disposed on the front portion of the camera and fed to the exposure controlling circuit 4 in the form of light-volume signal Se as illustrated in FIG. 1. From the exposure controlling circuit 4 is fed the exposing signal St representing correct exposure and which is output on the basis of a program relative to the brightness of the subject. The correct exposure signal fed from the circuit 4 is given to an electromagnet 42 mounted on the base plate A in terms of the time length corresponding to the brightness of the subject. That is, the electromagnet 42 is excited for the period of time proportional (inversely proportional in this embodiment) to the brightness of the subject.

An exposing mechanism in the exposure control means for properly determining an iris aperture to be formed in the shutter 37 includes the aforesaid exposure controlling circuit 4 and electromagnet 42 and further comprises an exposure setting member 43 which is supported slidably in the lateral direction in parallel with the shutter operating member 20 biased rightwardly in FIG. 4(A) by a spring 45 and provided with ratchet teeth 44, a check member 46 having an armature 47 which is attracted by the electromagnet 42 electromagnetically excited, and an aperture regulating member 48 fixed on the aperture setting member 43 and having an inclined edge 48a opposite to the guide pin 36a disposed on the shutter opening-closing member 36. The check member 46 is biased by a spring 46b so as to be engaged with the ratchet teeth 44 formed in the aperture setting member 43 as illustrated in FIG. 7, whereas it is disengaged from the ratchet teeth 44 of the member 43 by exciting the electromagnet 42, thereby to allow the aperture setting member 43 to return to the rest position. When the charge state as noted above (FIG. 6) is altered to the shutter releasing state by triggering the shutter operation member 20 so far retained in the charge position, the shutter operating member 20 and the aperture setting member 43 together move toward their rest positions by the force of the springs 21 and 45. At this time, the check member 46 is disengaged from the ratchet teeth 44 by means of the electromagnet 42 which is supplied with an electric current for the prescribed period of time corresponding to the brightness of the subject to be photographed. At the moment that the prescribed time has passed, the electromagnet 42 is demagnetized to permit the check member 46 to be released therefrom and intrude by force of the spring 46b between the adjacent ratchet teeth 44 which are specified in accordance with the brightness of the subject on the basis of the program set in the exposure controlling circuit 4. Consequently, the aperture setting member 43 which has moved thus far toward the rest position is suspended at the required position as illustrated in FIG. 7.

As can be understood from the foregoing, the number of the ratchet teeth 44 over which the check member 46 passes is determined in accordance with the brightness of the subject, since the check member 46 is engaged with the specified one of the ratchet teeth at the moment that the prescribed time has passed. Immediately after this, the shutter opening and closing operations are performed with the shutter opening-closing member 36 being operated so as to allow the guide pin 36b to move upwardly in the manner described hereinbefore as illustrated in FIG. 7. At this time, the guide pin 36b is restricted in its upward motion by the inclined edge 48a of the aperture regulating member 48 fixed on the aperture setting member 43, thereby to open restrictively the shutter 37 so as to form a desired iris aperture suitable for correct exposure. That is to say, the size of the aperture formed by the shutter 37 depends on the position of the inclined edge 48a of the aperture regulating member 48, at which the guide pin 36b comes in contact with the inclined edge 48a. Thus, the correct exposure can be obtained by the exposure controlling means as described above.

After the shutter opening and closing operations are carried out, the shutter operating member 20 moves to the rest position, the aperture setting member 43 does not return to the rest position and moves to the charge position together with the shutter operating member 20 at the time that subsequent film winding is performed.

[Automatic Focusing Operation]

For the sake of simplicity in description, the camera in this embodiment has an automatic focusing function of substantially focusing the lens system 51 on two points, i.e. a short-distance point and a long-distance point, often called a bifocal lens system. However, this should not be understood as limitative. Namely, a triple-focal lens system or stepless focusing lens system may applied thereto.

The focus control means for actuating the lens system back and forth includes, as essential elements, a lens mount frame 53 attached to the base plate A, a lens drive means 54 which holds the lens system 51 and is rotatably engaged with the lens mount frame 53, and a latch lever 55 by which the lens drive means 54 is restricted in rotation at a prescribed angle. The lens drive means 54 with the lens system 51 composed of one or more lenses rotates relative to the lens mount frame 53 to move the lens system back and forth for focusing. In this embodiment, the lens drive means 54 is operated to rotate by the return motion of the shutter operating member 20 toward the rest position, which is transmitted to the lens drive means 54 via the claw member 28 and an arm lever 54a extending outwardly from the lens drive means 54. With the rotation of the lens drive means 54, the lens system moves from the frontmost position to the rearmost position thereof or vice versa. Thus, the focal point of the lens system depends on whether the lens drive means 54 rotates to the limit or is stopped soon it starts to rotate. In order to selectively retain the rotational motion of the lens drive means 54, a stepped portion 54b is formed in the lens drive means 54 so that it can be caught by the latch lever 55 which is rockingly moved by a stem 46a disposed on the check member 46. When the latch lever 55 is operated to move toward the lens drive means 54 immediately after the lens drive means 54 starts to rotate, the latch lever 55 is engaged with the stepped portion 54b in the lens drive means 54, thereby to allow the lens system to be focused on the foreground (or background). If the latch lever 55 is not operated, the lens drive means is allowed to rotate to the limit so as to focus the lens system on the background (or foreground).

Because the check member 46 fulfills two functions of operating the latch lever 55 for determining the focal point of the lens system before the shutter releasing and retaining the aperture setting member 43 in the shutter releasing and as described above, the focusing operation is carried out by using the latch lever 55 prior to the shutter releasing operation which is fulfilled by moving the aperture setting member 43 as is apparent from the timing chart of FIG. 8. Namely, the distance measurement (AF') is carried out when the release lever 10 is in the standby section S, and subsequently, the focusing operation (AF) in which the lens system is driven is carried out when the release lever 10 reaches the trigger point T. Thereafter, the aperture setting operation (AE) is executed. Accordingly, the shutter releasing operation and the focusing operation do not interfere with each other, and the electromagnet 42 and check member 46 are used in common for performing these operations.

[Data Recording Operation]

The data recording operation in this invention is effected simultaneously with the aforementioned aperture setting operation (AE) and shutter opening-closing operation (SR) as shown in the timing chart of FIG. 8. Accordingly, the time required for one photographing shot can substantially be reduced to the utmost.

As described above, when the program switch means 60 establishes an electrical connection at the point C2, the data recording circuit 6 delivers a prescribed data signal to the data printing means 61 so as to print the data such as a date and time on the film loaded in the camera.

The outset of the data recording operation (DT) may be determined simultaneously with or immediately after the focusing operation (AF). In case of FIG. 8, the data recording operation is designed so as to start after the lens drive means 54 sets to work for focusing. The program switch means 60 which controls the timing of data recording includes a switching mechanism 62 composed of a slide electric collector 63 attached to the shutter operating member 20 and a contact pattern 64 formed on a printed circuit board 65 fixed onto the base plate A, as illustrated in FIG. 9.

In this embodiment, the slide electric collector 63 is formed in the shape of a fork having a pair of conductor pieces 63a, 63b and the contact pattern 64 has an input row Ri and an output row Ro opposite to the respective conductor pieces 63a, 63b, so that an electric current flows from the input row Ri to the output row Ro via the slide electric collector 63. The contact pattern 64 is designed so as to deliver at least three sorts of control output signals (C1–C3). That is to say, as illustrated in FIG. 8, when the slide collector 63 is in contact with the contact pattern 64 at the point C1, the control signal representing the charge state in which the film winding is completed is output. When the slide collector 63 moves to the point C2, the data recording signal DT is output, and when the slide collector 63 reaches C3, the film winding signal FW is output. Patterned conductors located between C2 and C3 are ground contacts for assuring stable operations of electric circuits and are not an indispensable element of this present. Also, the contact pattern 64 is not particularly limited in its pattern form.

As is apparent from the timing chart of FIG. 8, it is preferable that the point C2 at which the data recording signal DT is output should be close to the point C1 so as to terminate the data recording operation at or before the point C3. By bringing the point C2 closer to the point C1, the time required for one photographing shot can be reduced.

When the slide electric collector 63 moves from C1 to C2 as the shutter operating member 20 which has assumed the charge state is triggered to move toward its rest position, the data recording operation starts, and then, the aperture setting operation and the shutter opening-closing operation are carried out. The photographing shot is completed at the time the slide collector 63 reaches the point C3. As a matter of fact, when the slide collector 63 reaches C3, the film winding signal FW is output from the point C3 to effect the charging operation for the next photographing shot.

Though the contact pattern 64 is formed of two rows of conductors Ri, Ro corresponding to the forked slide conductor pieces 63a, 63b of the slide collector 63, the switch means 60 may be formed of signal row of conductor pattern as illustrated in FIG. 10. That is to say, one conductor strip 63' as the slide collector 63 is attached to the shutter operating means 20 and a conductor pattern row 64' is composed of a plurality of conductors arranged at the intervals corresponding to the prescribed timing for data recording. In this case, a signal current is applied directly to the shutter operating means 20 or slide collector 63' and the respective conductors constituting the conductor pattern row 64'. With this structure, the same function as in the program switch means shown in FIG. 9 can readily be fulfilled by discriminating the output points C1-C3 in the control circuits.

Otherwise, as illustrated in FIG. 11, there may be adopted a three-rowed type switching structure consisting of a three-forked slide collector 63" and a conductor pattern having an independent conductor 64a for triggering the data recording operation. Though this switching structure becomes somewhat complicated in structure, reliable switching operation can be expected.

Shown specifically in FIG. 12 is a schematic configuration electronic circuit to be used for controlling the desired consecutive photographing operation. The electronic circuit includes the exposure controlling circuit 4, the focus controlling circuit 5, a sensitivity setting circuit 7, a switching circuit 8 incorporating the program switch means 60, and an underexposure warning circuit 9. The data recording operation which is effected synchronously with the focusing and exposing operations will be explained in reference with FIG. 12.

The automatic focusing operation which is controlled by the focus controlling circuit 5 is fulfilled in the following manner. When the main switch 13 is turned to its ON state by depressing the release lever 10, a light-emitting device LED 1 is driven to allow infrared rays to be emitted and directed onto the subject to be photographed. The infrared rays are reflected by the subject and the reflected rays impinge on a light receiving device PD such as a photodiode. The light receiving device PD receives the direct light from LED 1 and the reflected light turning from the subject to generate and feed two outputs to a differential amplifier a3 via amplifiers a1, a2. A difference in incoming time between the direct light and the reflected light is obtained by the amplifier a3 and compared with a prescribed reference level in a comparator a4 so as to determine whether the distance to the subject to be photographed is longer or shorter. The switching state of a switching means Tr1 such as a transistor depends on the result of the comparison between the direct and reflected lights as noted above. For instance, in case the subject is located at a short-distance position, Tr1 is turned OFF and the switching state of Tr1 is detected by a first latch circuit L1 for an autofocusing operation so as to turn OFF a transistor Tr2 and turn ON a transistor Tr3 to flow an electric current through the electromagnet 42. The electromagnet 42 is kept in its magnetized state for a prescribed period of time by means of the first latch circuit L1. During the prescribed period of latching the electromagnet 42 in its magnetized state, the latch lever 55 is kept in the disengaged state with the stepped portion 54b of the lens drive means 54 so as to allow the lens system to be thrust forward, thereby to focus the lens system on the subject located at a relatively short distance.

The aperture setting operation is effected by the exposure controlling circuit 4. First of all, a sensitivity discriminating means (not shown) which is generally formed on a film cassette is detected optically or mechanically by the sensitivity setting circuit 7 to determine a reference sensitivity value. With a comparator a5 in the underexposure warning circuit 9, the reference sensitivity value thus detected is compared with a light volume value obtained by detecting the brightness of the subject by use of a photoelectric detector 41. In case of a low degree of brightness, a warning element LED2 is optically driven to issue a warning. With a comparator a6 in the exposure controlling circuit 4, the aforementioned reference sensitivity value is compared with capacity C whose discharging time is determined by a photoelectric detector 41', consequently to give a biasing signal corresponding to the brightness of the subject to a switching element Tr4. On the other hand, when the main switch 13 is in the ON state, a second latch circuit L2 is operated to assume its latched state under the control of an oscillator OSC and a counter CC, thereby to switch ON a switching element Tr5. When Tr5 is turned ON, the biasing signal applied to Tr4 is removed to turn ON Tr4 and a switching element Tr3 with the result that the electromagnet 42 is magnetized. The magnetization of the electromagnet 42 continues for the prescribed period of time, and thereafter, the latch circuit L2 turns OFF to demagnetize the electromagnet 42. Thus, by magnetizing and demagnetizing the electromagnet 42 while the aperture setting member 43 moves from the charge position toward the rest position together with the shutter operating member 20, the check member 46 is brought into engagement with a prescribed one of ratchet teeth 44, thereby to form the desired aperture in the shutter.

The data recording operation is effected by outputting the data printing signal from a terminal V of the program switch means 60 to the data recording circuit 6 when the program switch means 60 moving with the shutter operating member 20 reaches the output contact point C2 while the first latch circuit L1 of the focus controlling circuit 5 acts on Tr2. Thus, data such as a date, time and so on can be printed on the film with exquisite timing.

The present invention should not be understood as being limited to the exact structure of the illustrated circuit. Though the embodiment described above is applied as one example to a compact automatic camera, the data recording system according to this invention may be applied to various types of automatic cameras such as full-auto single-lens reflex cameras, as a matter of course.

As is apparent from the above, this invention provides a camera having a data recording function of effectively and reliably printing data such as date and time on a film, without enlarging the time required for one consecutive photographing shot including auto-exposing, auto-focusing and shutter opening-closing operations. Thus, the camera according to this invention enjoys fast execution of the movements from shutter releasing to film winding and can be made small and easily portable because the program switch means which is adapted for prescribing the timing of data recording and additionally attached to the shutter operating member is simple in structure. Besides, since light measurement for exposing and distance measurement for focusing can be effected in the idling state of the release lever for releasing the shutter prior to the data recording, the photographing operation can be called off without printing the data on the film upon confirming underexposure, thereby to avoid failure of photographing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A camera having a function of data recording, comprising:
    a release lever which brings about a shutter releasing state when being pressed to a trigger point;
    focus control means for effecting measurement of a distance from a lens system of the camera to a subject to be photographed and actuating the lens system in accordance with the measured distance to the subject so as to focus the lens system on the subject in the shutter releasing state;
    exposure control means for effecting measurement of brightness of the subject and determining an aperture in size formed in a shutter in accordance with the measured brightness of the subject in the shutter releasing state;
    a shutter operating member which moves from its rest position to its charge position while a film winding is effected and returns from the charge position to the rest position in the shutter releasing state;
    a shutter driving member for opening and closing the shutter after completing the measurement of the distance effected by said focus control means and the measurement of the brightness effected by said exposure control means in the shutter releasing state;
    program switch means including a slide electric collector and a contact pattern which are slidably moved relative to each other with said shutter operating members, one of said slide electric collector and a contact pattern being formed on said shutter operating member so as to perform a switching action in conjunction with said shutter operating member so as to output a data recording signal while said shutter operating member returns from the charge position to the rest position in the shutter releasing state; and
    data printing means for printing required data on a film loaded in the camera in response to the data recording signal output from the program switch means in shutter releasing.

2. A camera having a function of data recording, comprising:
    a base plate disposed within said camera and provided with a printed circuit board;
    focus control means for effecting measurement of a distance from a lens system of the camera to a subject to be photographed and actuating the lens system in accordance with the measured distance to the subject so as to focus the lens system on the subject;
    exposure control means for effecting measurement of brightness of the subject and determining an aperture formed in a shutter in accordance with the measured brightness of the subject;
    a shutter operating member which is mounted slidably on said base plate and moves from its rest position to its charge position while a film winding is performed and returns from the charge position to the rest position in shutter releasing;
    a shutter driving member for opening and closing the shutter after completing the measurement of the distance taken by said focus control means and the measurement of the brightness taken by said exposure control means;
    program switch means having a slide electric collector attached to said shutter operating member and a contact pattern which includes a plurality of conductors formed on said printed circuit board fixed on said base plate, which program switch means performs switching actions in conjunction with said shutter operating member while said shutter operating member returns from the charge position to the rest position in shutter releasing, said contact pattern having a length substantially equal to that from the rest position to the charge position of said shutter operating member and provided with a first contact point for outputting a charge state signal, a second contact point for outputting a data recording signal, and a third contact point for outputting a film winding signal, said first, second and third contacts being arranged in order from the charge position to the rest position; and
    data printing means for printing required data on a film loaded in the camera in response to the data recording signal output from the program switch means in shutter releasing.

3. A camera according to claim 2, wherein said shutter operating member retained at the charge position is triggered to move toward the rest position by means of a release lever mounted movably on a base plate in the camera, said release lever being movable within a stroke defined by an idling section and a standby section which has a trigger point therein, said release lever being provided with a main switch which is operated to switch on at least said focus control means when said release lever reaches the standby section and allowing said shutter operating member retained at the charge position to be triggered to move toward the rest position when said release lever reaches the trigger point.

4. A camera according to claim 2, wherein said shutter operating member retained at the charge position is triggered to move toward the rest position by means of a release lever mounted movably on the base plate in the camera, said release lever being movable within a stroke defined by an idling section and a standby section which has a trigger point therein, said release lever being provided with a main switch which is operated to switch on at least said focus control means when said release lever reaches the standby section and allowing said shutter operating member retained at the charge position to be triggered to move toward the rest position when said release lever reaches the trigger point.

* * * * *